INVENTORS
PRESTON SAWYER
ALFRED J. HOFFLER
ROBERT A. DEWEY
EDWARD S. CLARKE III
BY
B. L. Zangwill
ATTORNEY

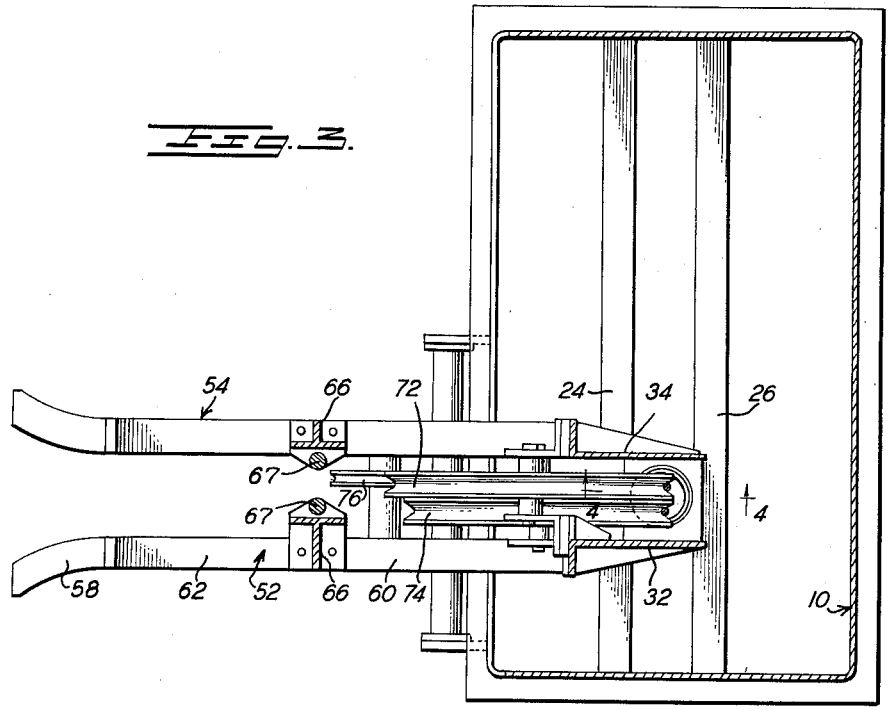
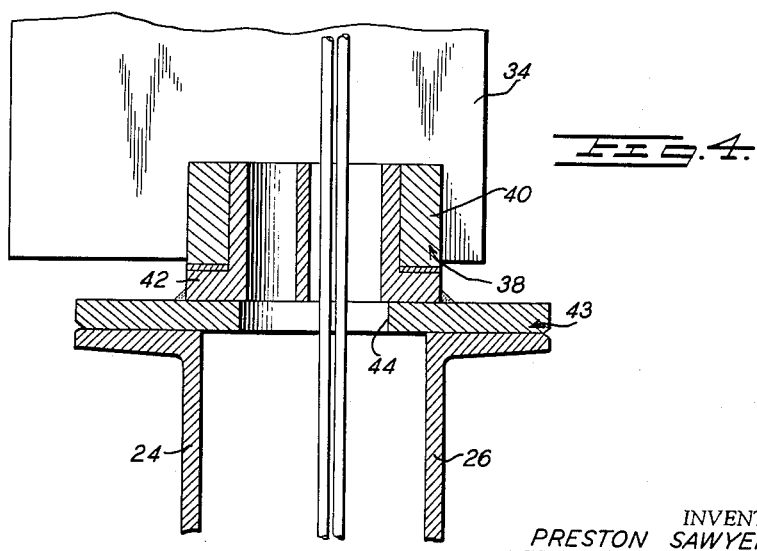

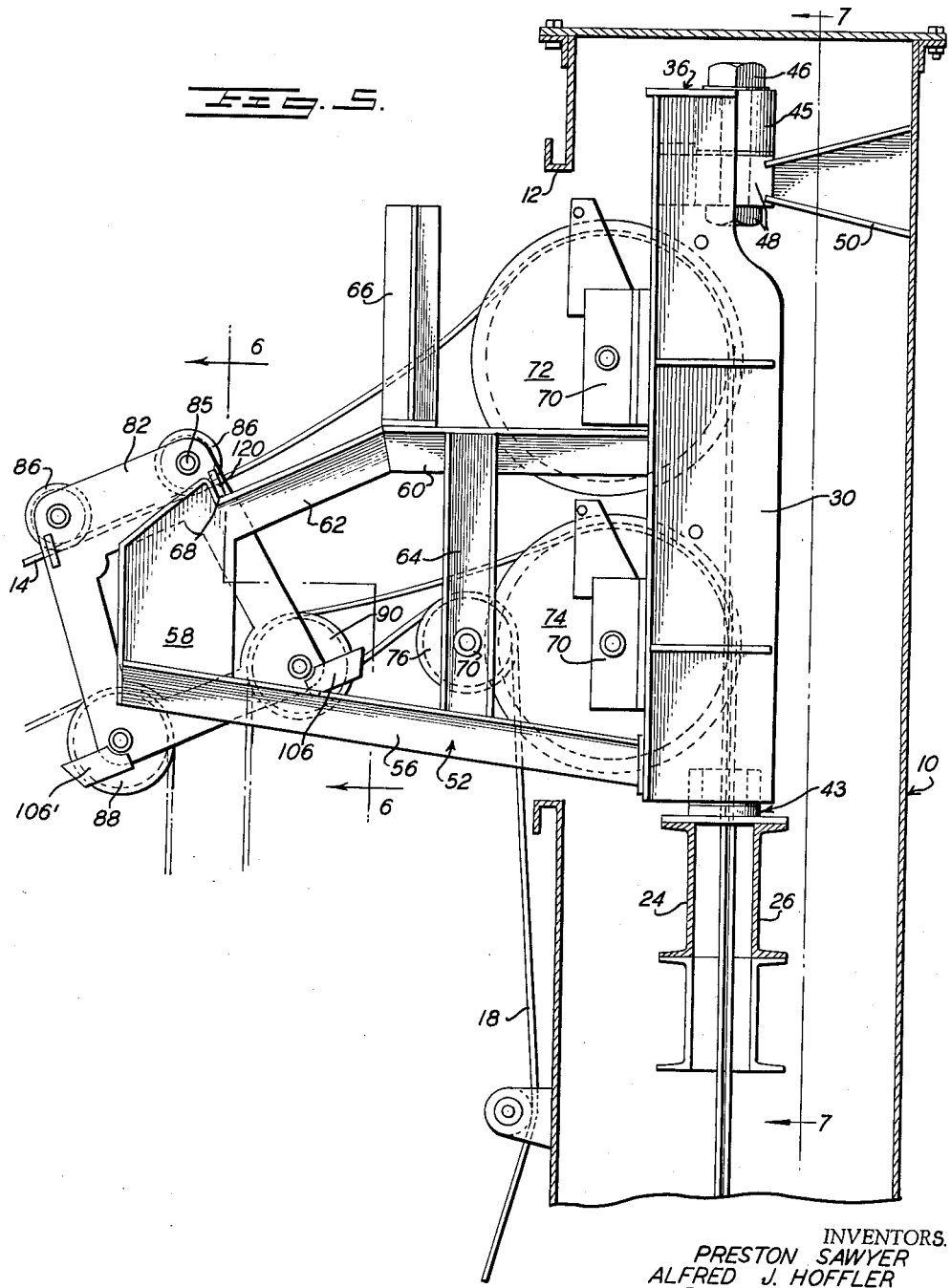

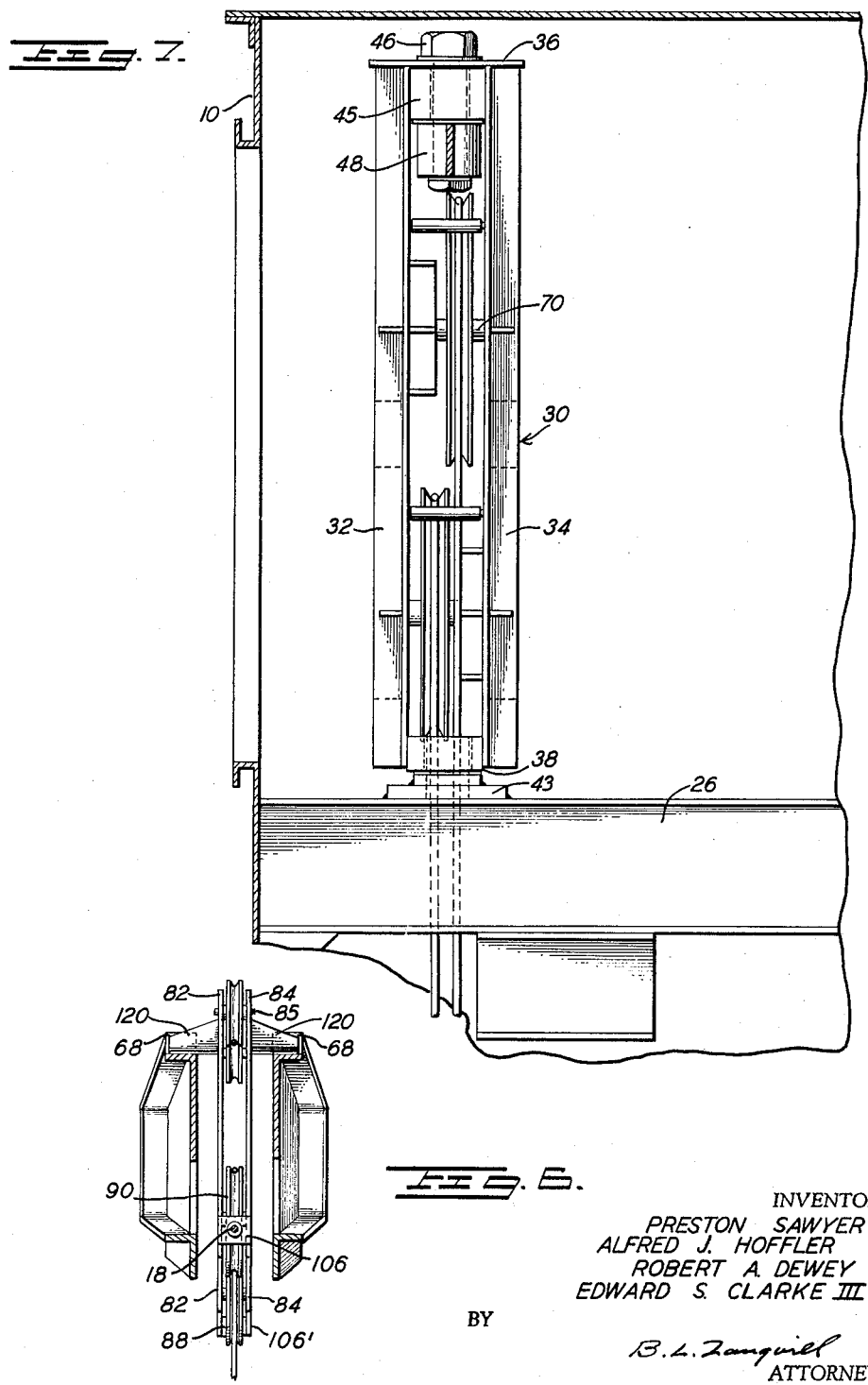

United States Patent Office 3,012,518
Patented Dec. 12, 1961

3,012,518
RIGGING MEANS FOR SHIP'S LOAD-TRANSFER DEVICE
Preston Sawyer, Norfolk, and Alfred J. Hoffler, Robert A. Dewey, and Edward S. Clarke III, Portsmouth, Va., assignors to the United States of America as represented by the Secretary of the Navy
Filed Mar. 27, 1958, Ser. No. 724,490
9 Claims. (Cl. 104—114)
(Granted under Title 35, U.S. Code (1952), sec. 266)

The invention described herein may be manufactured and used by or for the Government of the United States of America for governmental purposes without the payment of any royalties thereon or therefor.

This invention is directed to improved means for locking and releasing the trolley of a high line transfer system of a type used to transfer loads between ships at sea.

Loads are transferred between ships at sea by stringing a wire rope, or cable, from the load-sending ship to the load-receiving ship, the cable serving as a support for a trolley that can be pulled along the cable and from which the load is suspended. In the transport of dry loads, a cable of this kind is customarily called a high line. In use, the ends of the high line are secured to high points of the ships; and the highline is kept in sufficient tension to support itself and the load above water, the load being carried by a trolley that rides on the high line. The trolley and its load are moved along the highline from one ship to the other by means of inhaul and outhaul lines attached to the trolley but operable from the ships. Previous to this invention, trolleys, when not in use, were simply laid on the deck of the load-sending ship; and the rigging and unrigging of a trolley to and from a raised high line were hazardous and difficult tasks.

An object of the invention is to provide a structure by means of which the sending end equipment of a high line transfer system can be easily rigged and unrigged.

An object of the invention is to provide a safe, out-of-the-way place for stowage of the trolley of a transfer system of a type described.

In accordance with the invention the high point from which the high line is suspended on the sending ship is provided with equipment constituting a berth or station for receiving the trolley, the equipment and trolley being so constructed and arranged that the trolley can be deposited in and locked to the equipment when not in use, but in such a way as to be readily released and put into operation when desired. Further in accordance with the invention, the high line itself is used for locking and releasing the trolley.

It is, accordingly, a further object of the invention to provide a trolley locking and releasing means that can be readily applied to load transfer systems, that is extremely simple in construction and operation, and that can be easily operated.

Other objects and many of the attendant advantages of this invention will be readily appreciated as the same becomes better understood by reference to the following detailed description when considered in connection with the accompanying drawings in which parts have been simplified and details omitted in the interests of brevity and better understanding of the invention. In the drawings, which are generally partly in section:

FIG. 3 is a sectional view of the stowing equipment taken substantially on the line 3—3 of FIG. 2, the trolley being removed;

FIG. 4 is a sectional view taken substantially on the line 4—4 of FIG. 3;

FIG. 5 is a vertical view at the high point, showing the trolley stowed in the stowing equipment;

FIG. 6 is a sectional view substantially on the line 6—6 of FIG. 5; and

FIG. 7 is a sectional view substantially along the line 7—7 of FIG. 5.

Figure 1:
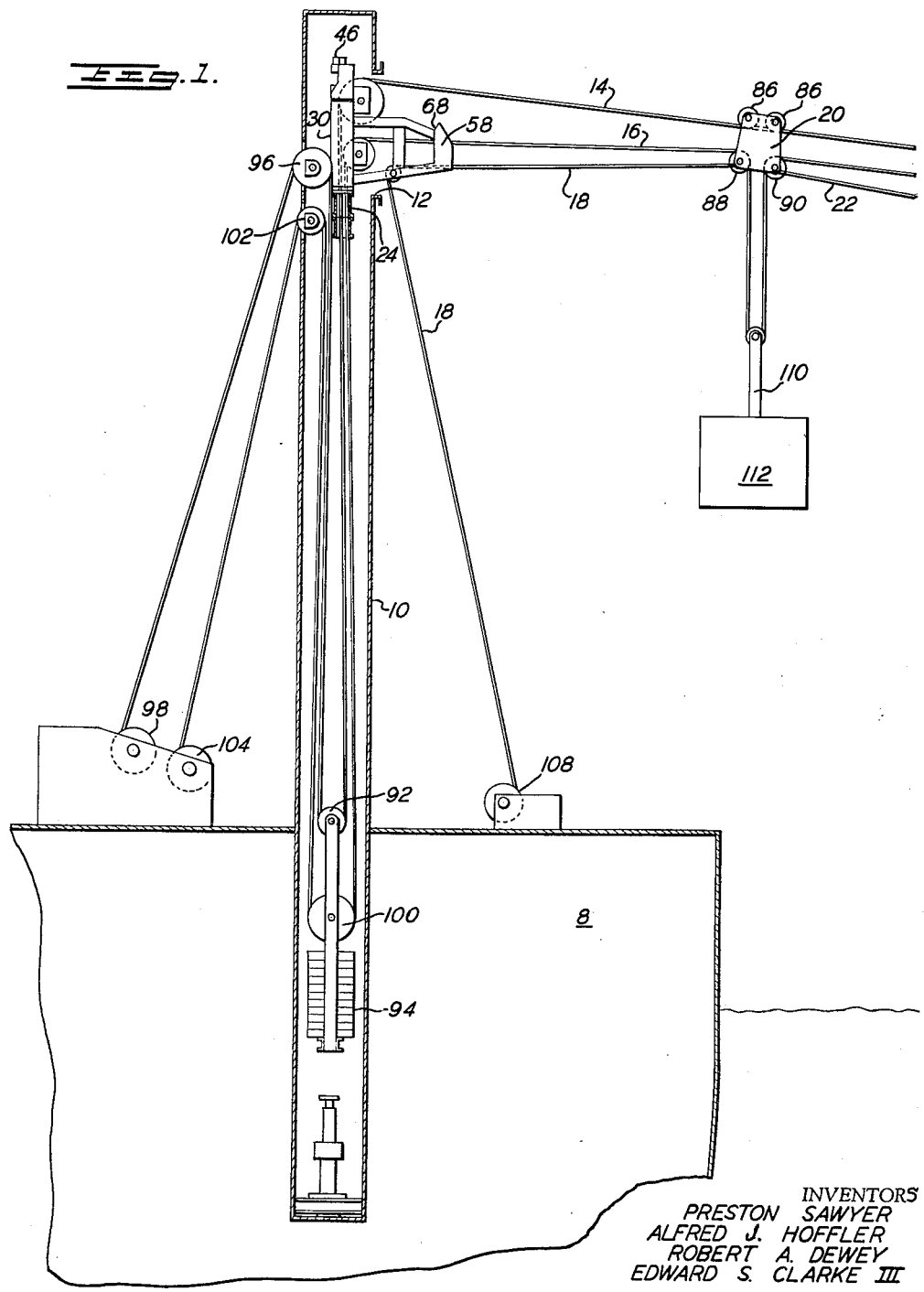
FIG. 1 is a simplified schematic view of the sending end of a high line transfer system embodying the invention.

In FIG. 1, the load-sending ship is indicated at 8, and it is provided with means for rigging a high-line transfer system to a load-receiving ship, not shown. This means comprises a hoistway or shaft 10 in the nature of an elevator shaft, the hoistway extending well above and below the main deck of the ship and having ladder means not shown for accessibility.

The lines of a highline transfer system for transferring dry loads comprise a high line 14, a load line 16 and an inhaul line 18. The near or sending ends of these lines pass through an opening 12 that faces the receiving ship, the lines being rigged in a manner subsequently described. The high line 14 and load line 16 are continuous and have their far or outboard ends anchored to high points on the receiving ship. The far end of the inhaul line 18 is anchored to the near side of a trolley 20 that is supported by and rides on the high line. The far side of the trolley 20 has anchored thereto an end of an outhaul line 22 that extends to a pulley system and winch on the receiving ship.

Figure 2:
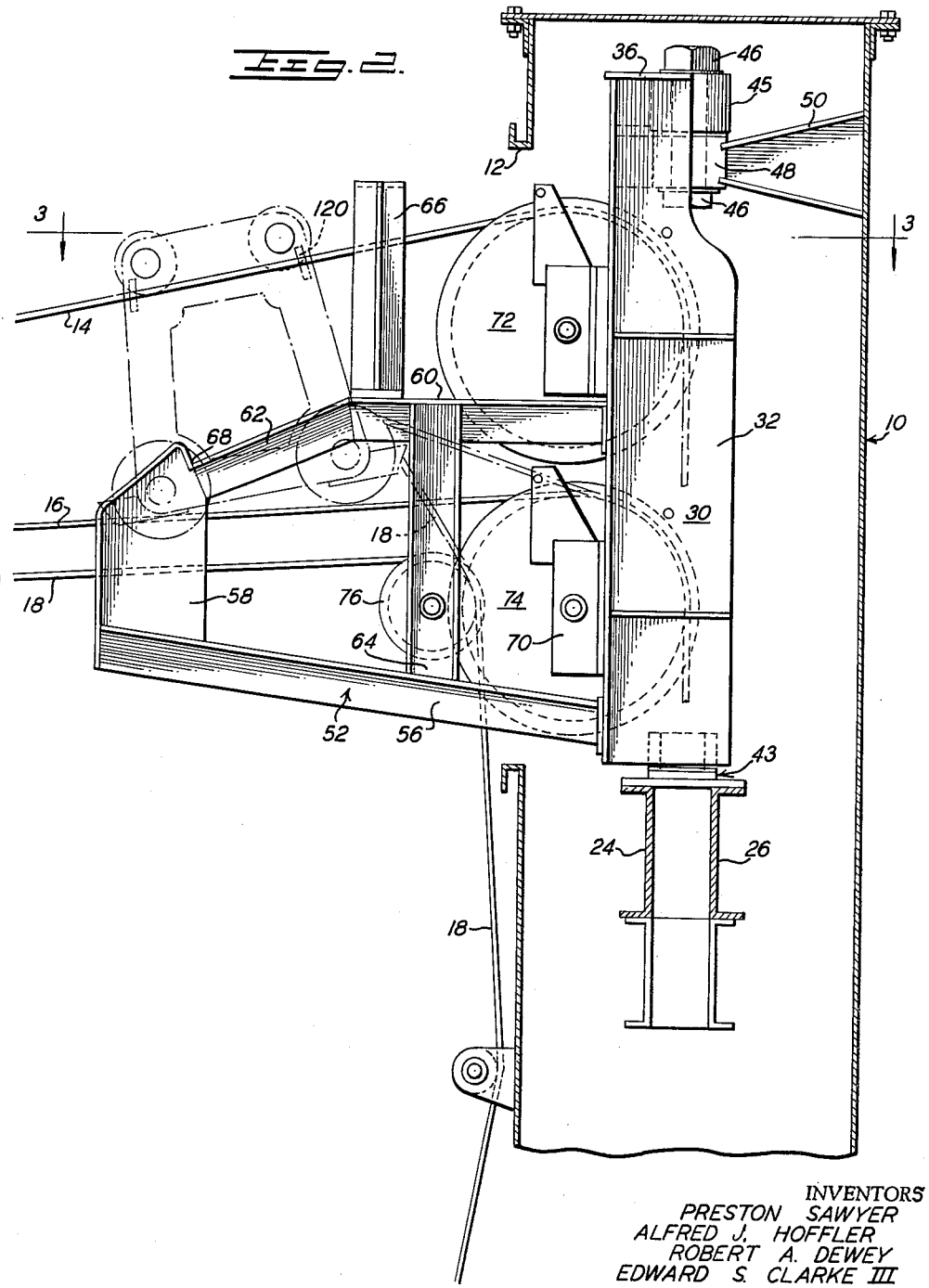
FIG. 2 is a vertical view of the high point of the system of FIG. 1 showing in solid lines the stowing equipment and system lines in their condition while a load is being transferred, and showing in broken lines the trolley position when it is about to be stowed.

The upper end of the hoistway 10 is provided with berthing or stowing equipment for partially rigging the lines 14, 16 and 18, and for berthing or stowing the trolley 20. This equipment is carried on supporting means comprising spaced parallel channels 24 and 26 that extend transversely completely across and are firmly secured to sides of the hoistway 10. As better shown in FIGS. 2 and 7, the equipment comprises a vertical, rectangular framework, indicated in its entirety by the reference numeral 30, which is rotatably carried centrally in the hoistway 10 by the channels 24 and 26. The framework comprises strengthened long sides 32 and 34, a top 36 and a bottom 38. As shown in FIG. 4, the bottom 38 has a short tubular journal 40 that can swivel on a fixed bearing 42. The bearing 42 is part of a base structure 43 which is secured to the channels 24 and 26, and has a central hole 44. As shown in FIGS. 2, 5, and 7, the top 36 of the framework 30 has an eye piece 45 that receives a journal pin 46 which also passes through a fixed eye piece 48 at the end of a bracket 50 firmly attached to the hoistway 10. The pin 46 is removably secured in position but is axially in line with bearing 42 so that framework 30 can swivel about a vertical axis on the pin and bearing. Stops may be provided to limit the swing of the framework.

In addition to the framework 30, the rigging equipment comprises a pair of parallel arms or frames 52 and 54 firmly secured to and projecting from the framework sides 32 and 34, respectfully, the frames protruding through the opening 12 in the hoistway 10.

The frames 52 and 54 are generally similar with right and left hand relationship, so that a description of one should suffice for the other also. With reference to FIGS. 2, 3 and 5, the frame 52 comprises a bottom angle bar 56, a front piece 58, a top angle bar 60, and a downwardly sloping angle bar 62 joining the front piece 58 and top angle bar 60. An upright reinforcing and supporting channel 64 extends between the top and bottom angles 56 and 60, as shown. The faces of the various pieces or bars of the frame that face the other frame are substantially co-planar. Each frame also has an upstanding T-shaped high-line-confining guide piece 66 extending upwardly from the top piece 60. This guide piece comprises top and bottom plates between which is fixed a vertical round rod 67 (FIG. 3) inwardly of the facing planes of the frames. The high line passes between rods 67.

It is to be observed in FIGS. 2 and 7 that the front piece 58 has an upper edge that protrudes upwardly above the adjacent portion of the angle bar 62 so as to provide a latching seat 68 on the rigging equipment for the trolley 20. It is to be noted that each of the seats 68 is open on its upper side; that is, each seat is concave upward. Because the seats are concave upward, lugs or keepers on the trolley 20 can be dropped into and raised from the seats, as subsequently described.

The framework 30 and frames 52 and 54 also include bearing means, such as 70, for sheaves 72, 74 and 76 for the high line 14, load line 16, and inhaul line 18, respectfully; the sheaves being arranged so that the high line is above the load line which is above the inhaul line.

The high line 14 supports the trolley 20 which, as shown in simplified form in FIGS. 5 and 6, comprises a pair of parallel trapezoidal frame sides 82 and 84 spaced by a plurality of short relatively stationary axles 85 that carry a pair of upper sheaves or grooved wheels 86 that ride on the high line, and carry lower sheaves 88 and 90 at the lower corners for the load line, in accordance with common practice.

As shown in simplified form in FIGS. 1, 2 and 5, the high line 14 may pass around sheave 72 downwardly in hoistway 10 through framework 30 and base structure 44 to a sheave means 92 at the top of a weighted cage or counterweight frame 94 slidable up and down in hoistway 10. After passing about sheave means 92, the high line 14 goes upwardly in hoistway 10 to a sheave 96 on hoistway 10 and then downwardly to a winch 98. The load line 16 is similarly strung about the sheave 74 at the rigging equipment, about sheave 100 on the frame 94, to an upper sheave 102 and to a winch 104. The weighted frame 94 maintains a substantially constant tension on high line 14 and rides up and down in hoistway 10 as more fully shown and described in the copending application of Milton R. Pristach, Serial No. 724,489, filed concurrently herewith, and now Patent No. 2,942,740, dated June 28, 1960.

As shown in FIG. 5, the near lower corners of trolley 20 have a spanning U-shaped lug 106 to which inhaul line 18 is secured. The line then passes over sheave 76 and finally to a winch 108 on ship 8. The other lower corner of the trolley is also provided with means 106' for securing the outhaul line thereto which goes to a winch on the receiving ship.

As indicated in FIG. 1, the load line 16 has a bight between sheaves 88 and 90 of the trolley 20, the lower bend of the bight being wrapped around a sheave on a hook 110 that carries skip box or load-carriage 112. By pulling on the inhaul and outhaul lines the trolley 20 and load-carriage 112 are moved between ships; and by operation of load line winch 104, the load-carriage is raised from and lowered to deck level for loading and unloading.

Further in accordance with the invention, the near upper corners of the trolley 20 toward the sending ship 8 are provided with a pair of extension lugs or keepers 120, better shown in FIG. 6. These keepers 120 form supporting arms for stowing the trolley in the berthing equipment in the manner also shown in FIG. 5. The keepers 120 are firmly secured to and extend outwardly or transversely from the frame sides 82 and 84 of the trolley. The transverse distance between the outermost ends of the keepers is significantly more than the spacing between the facing faces of the frames 52 and 54. Desirably, the transverse length of each keeper should be more than the sum of the clearances from the trolley to the frames 52 and 54.

After the load transfer operations have been completed, the system must be unrigged. The load carriage 112 is readily removed and handled on deck; and the load block hook 110 is hooked to an eye pad secured on the deck of the ship. The free or outboard end of the load line is then secured to the bulwark of the ship. The trolley is pulled to the inboard position shown in FIG. 2 by the inhaul line, a stop being provided on each of the frames 52 and 54 to limit movement of the trolley toward sheave 76. In accordance with the invention, the inhaul line sheave 76 and the stops are so disposed that in this inboard position the trolley keepers or lugs 120 are well inwardly, that is toward hoistway 10, with respect to seats 68 of the stowing equipment. The high line winch 98 is then operated to lower the counterweight frame 94 until the frame rests on buffer means at the bottom of the hoistway. Further operation of the winch 98 in the same direction loosens or slacks the high line 14 so as to cause the trolley 20 to drop until the keepers 120 on the trolley rest on the sloping angle bars 62 of the frames 52 and 54. The inhaul line 18 is then also slightly loosened by operation of winch 108 so that further release of inhaul line 18 permits the trolley to slide down on angles 62 until the keepers 120 seat in seats 68 of the frames 52 and 54. The unloaded high line can then be drawn in and its outboard end attached to the bulwark of the sending ship until the line is to be used again, and the inhaul line can be similarly secured; the lines holding the trolley secure in the stowing equipment.

For releasing and rigging the trolley when the load transfer system is again put into operation, the reverse operations take place. With the lines rigged and loose, it is apparent that upon tensioning of the high line 14 the trolley will be raised from its rest station for free riding on the high line. During use, the swivel of the framework 30 about pin 46 and journal 40 permits the high and other lines to orient toward the receiving ship.

Obviously many modifications and variations of the present invention are possible in the light of the above teachings. It is therefore to be understood, that within the scope of the appended claims, the invention may be practiced otherwise than as specifically described.

What is claimed is:

1. A transfer system for transferring a load from a load-sending ship to a load-receiving ship while the ships are at sea, comprising in combination, a hoistway fixed on said load-sending ship and extending above the main deck of the ship, a high line and a load line extending between ships, a trolley ridable on said high line, inhaul and outhaul lines attached to said trolley, and means rigging said high line to said hoistway, said rigging means comprising weight means slidable in said hoistway for tensioning said high line, said rigging means comprising a framework at the upper part of said hoistway, a plurality of sheaves for said high line and said load line rotatably mounted on said weight means and on said framework, and an upstanding pivot pivotally mounting said framework on said hoistway.

2. A transfer system as defined in claim 1 wherein said rigging means comprises sheave means rotatably mounted on said framework for said inhaul line.

3. A transfer system as defined in claim 2 but further characterized by having stowing means for said trolley, said stowing means comprising cooperating seat means and lug means, one of the two last said means being a part of said trolley and immovable relatively thereto, and the other being a part of said framework and immovable relative thereto.

4. A transfer system for transferring a load from a load-sending ship to a load-receiving ship while the ships are at sea, comprising in combination, a hoistway on said load-sending ship extending above the main deck of the ship, a high line and a load line extending between ships, a trolley ridable on said high line, inhaul and outhaul lines attached to said trolley, and means rigging said high line to said hoistway, said rigging means comprising weight means slidable in said hoistway for tensioning said high line, said rigging means comprising a framework at the upper part of said hoistway, sheave means for said high line and said load line rotatably mounted on said framework, and an upstanding pivot pivotally mounting said framework on said hoistway, said rigging means comprising sheave means rotatably mounted on said framework for said inhaul line, said framework having stowing means for said trolley, said trolley and stowing means have cooperative means comprising seat means on one and lug means on the other disposed intermediate the tops of said high line sheave means and said inhaul line sheave means when said trolley is stowed.

5. Rigging and stowing means for stowing the trolley of a high line transfer system for ships, comprising a trolley, sheave means for the high line on which the trolley rides, said trolley having means for receiving inhaul and outhaul lines therefor, said trolley having lug means extending sidewise therefrom, a framework supporting said sheave means and having a pair of arms having fixed concave upward seat means below the top of said trolley when the trolley is adjacent to said sheave means for receiving said lug means, said sheave means being disposed so that the high line extends between said arms.

6. Rigging and stowing means for stowing the trolley of a high line transfer system for ships having an inhaul line attached to the trolley, comprising a trolley ridable on the high line, high line sheave means for said high line, sheave means below said high line sheave means for said inhaul line, arm means extending below the top of said high line sheave means in the direction that the high line extends, means for dropping said trolley while it is adjacent said high line sheave means, said trolley and arm means having cooperating seat means and lug means adapted to engage when said trolley is first adjacent said high line sheave means and then dropped.

7. An invention as defined in claim 6 wherein said seat means is on said arm means and comprises downwardly and outwardly sloping portions for initially receiving said lug means when said high line is dropped with said trolley adjacent said high line sheave means, said seat means being at the bottom of said sloping portions.

8. Rigging and stowing means for a system for transferring loads between two stations, including a high line between the stations, a trolley ridable on said high line, a framework comprising a sheave rotatably mounted thereon for said high line, said framework comprising a pair of spaced vertical arms, each arm having a surface sloping downwardly in a direction away from said sheave, and a concave upward seat at the bottom of said surface, said trolley having lugs extending therefrom and being ridable between said arms with said lugs over said surfaces, and means for raising and lowering said trolley to raise said lugs from and to lower them on said surfaces and seats.

9. An invention as defined in claim 8 but further characterized by an upright pivot means pivotally carrying said framework.

References Cited in the file of this patent
UNITED STATES PATENTS

| | | |
|---|---|---|
| 668,071 | Walsh | Feb. 12, 1901 |
| 777,685 | Miller | Dec. 20, 1904 |
| 986,012 | Kinney | Mar. 7, 1911 |
| 1,122,080 | Decker | Dec. 22, 1914 |
| 1,187,540 | Miller | June 20, 1916 |
| 1,201,206 | Lewis | Oct. 10, 1916 |
| 1,873,196 | Harris et al. | Aug. 23, 1932 |